United States Patent [19]

Mrenna et al.

[11] 3,796,922
[45] Mar. 12, 1974

[54] ENCLOSED SWITCHGEAR WITH IMPROVED INSULATING SUPPORT MEANS

[75] Inventors: Stephen A. Mrenna; Glenn R. Thomas, both of Beaver, Pa.

[73] Assignee: Westinghouse Electric Corporation, Pittsburgh, Pa.

[22] Filed: Aug. 24, 1972

[21] Appl. No.: 283,616

Related U.S. Application Data

[62] Division of Ser. No. 88,380, Nov. 10, 1970, abandoned.

[52] U.S. Cl............... 317/112, 317/120, 200/50 A
[51] Int. Cl............................................ H02b 1/06
[58] Field of Search ......... 200/50 A; 317/112, 118, 317/119, 120

[56] References Cited
UNITED STATES PATENTS 2,988,612   6/1961   Hercules............................ 317/120
3,155,786   11/1964   Stegmaier......................... 317/120

Primary Examiner—Herman Hohauser
Assistant Examiner—Gerald P. Tolin
Attorney, Agent, or Firm—W. A. Elchik

[57] ABSTRACT

The herein disclosed enclosed switchgear comprises an enclosure and switchgear supported in the enclosure with efficient utilization of the available space within the enclosure. A fuse clip terminal connector is constructed and arranged to enable the positioning of a fuse close to an end wall of the enclosure. Two enclosed circuit interrupters are constructed and arranged to efficiently utilize available space and to provide adequate insulation between adjacent line terminal conductors. An improved cover interlock is provided to releasably lock the cover closed when the circuit interrupter is closed and to prevent closing of the circuit interrupter when the cover is only partially closed.

3 Claims, 9 Drawing Figures

PATENTED MAR 12 1974 3,796,922

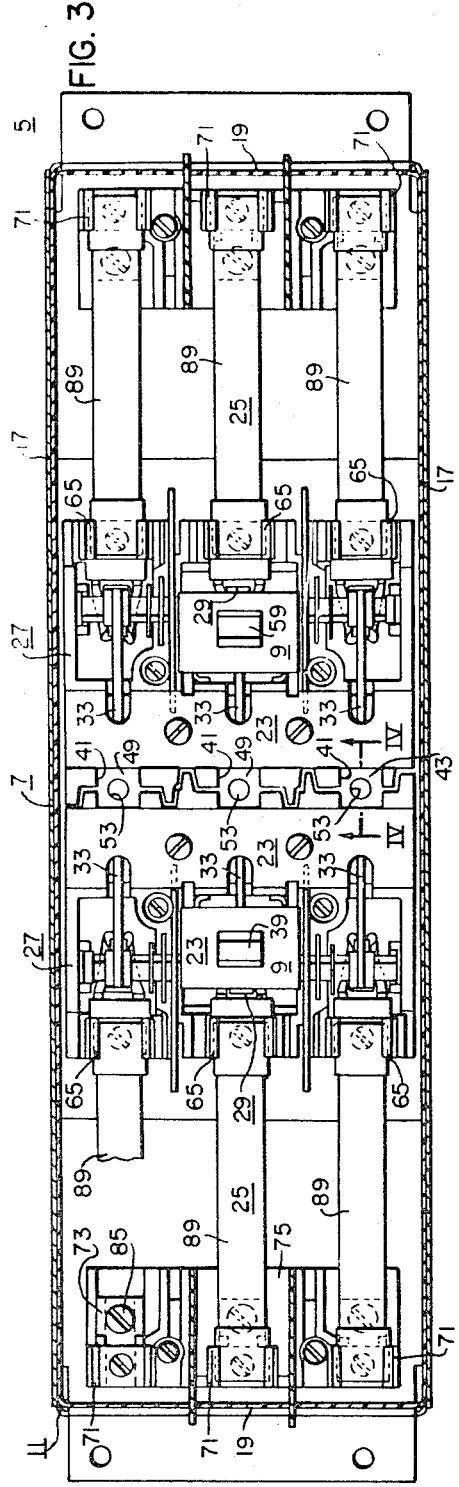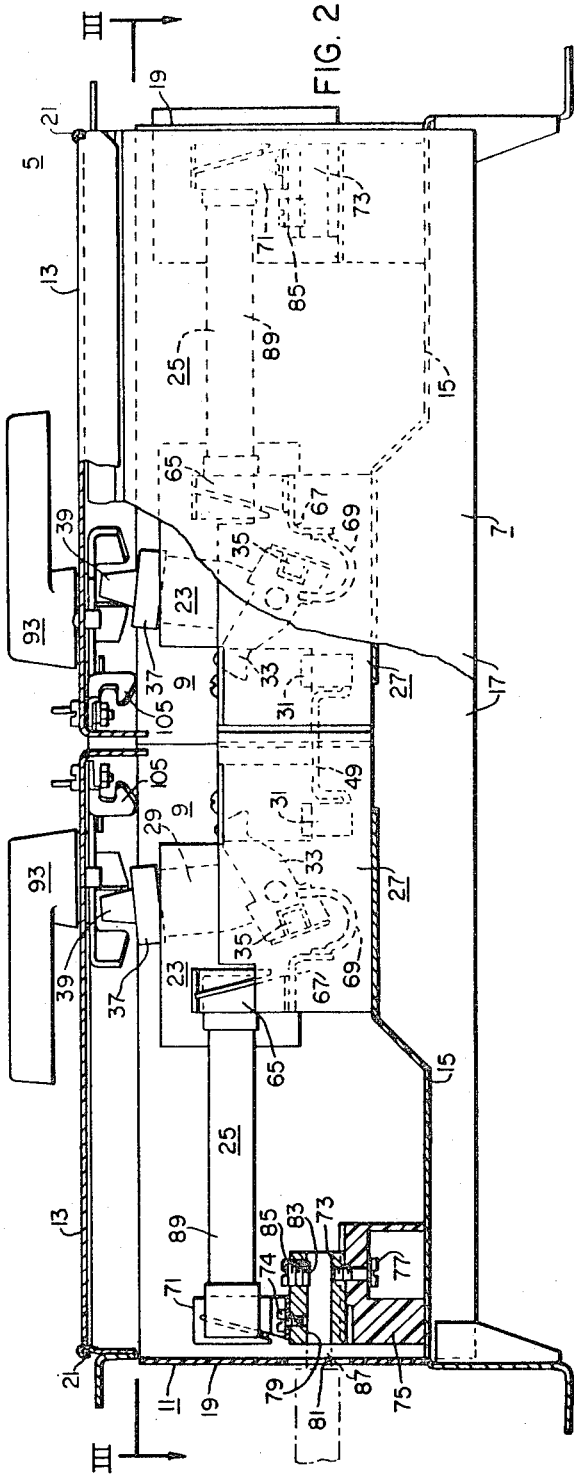

3,796,922

ENCLOSED SWITCHGEAR WITH IMPROVED INSULATING SUPPORT MEANS

This is a division, of application Ser. No. 088380 filed Nov. 10, 1970 now abandoned.

BACKGROUND OF THE INVENTION

1. Field of the Invention

Enclosed switchgear of the type comprising a receptacle with a pair of fused circuit interrupters supported within the receptacle and externally operable handle operating means mounted on a pair of openable covers at the front of the receptacle for enabling external manual operation of the enclosed circuit interrupters.

2. Description of the Prior Art:

It is old in the art to provide enclosed switchgear of the type comprising a receptacle with a pair of circuit interrupters supported in the receptacle in an end-to-end relationship and with a separate fuse means in electrical series with each of the circuit interrupters. It is also old to provide externally operable handle operating means supported on a openable cover of an enclosure for permitting external manual operation of an enclosed circuit interrupter, with defeatable interlock means for releasably locking the cover closed when the circuit interrupter is closed. This invention is an improvement over the prior art in that the construction of the herein disclosed enclosed switchgear provides efficient utilization of the available space within the enclosure; provides close back-to-back mounting of the enclosed circuit interrupters with improved means for providing adequate insulation between adjacent common line terminal conductors; and provides a dependable safety cover interlock of simple construction.

SUMMARY OF THE INVENTION

The herein disclosed enclosed switchgear comprises a receptacle and a pair of multi-pole circuit interrupters supported in the receptacle. Each of the circuit interrupters comprises an insulating support block formed with a separate pole unit cavity at the line end thereof for each pole unit thereof, with barrier means between adjacent pole units, and with each cavity being open at the front, the back and the line end of the support block. The support blocks are supported in an end-to-end relationship to provide common pole unit cavities. The support blocks at the line ends thereof are formed with cooperating mating end formations that cooperate to provide a tortuous over-the-surface path between adjacent common pole unit cavities. A separate common line terminal conductor is supported in each of the common cavities and connected in electrical series with the associated pole unit contacts of both of the circuit interrupters. An openable cover is supported at the front of the receptacle. There is an externally operable handle operator supported on the cover for movement about an axis normal to the plane of the cover to operate the associated enclosed circuit interrupter. A latch part fixedly secured to the receptacle cooperates with a cover latch that is supported on the cover for movement about an axis normal to the plane of the cover. Upon operation of the handle operator to the open position the handle operator operates against the cover latch to pivot the cover latch against the bias of spring means to the latching position. Upon operation of the handle operator to the closed position the handle operator releases the cover latch and the biasing means operates to move the cover latch to the latching position. Externally operable means is provided to enable defeat of the cover latch and opening of the cover when the circuit interrupter is closed. The cover latch prevents closing of the circuit interrupter by operation of the handle operator when the cover is only partially closed.

There is a separate fuse means supported in the receptacle for each of the two circuit interrupters. Each of the fuse means comprises a pair of fuse clips, for each pole unit of the associated circuit interrupter, supported between the associated circuit interrupter and an end wall. The fuse clips are spaced in the direction between the circuit interrupter and the associated end wall. Each of the end walls is provided with opening means therein for receiving conducting lines. There is a separate terminal block for each pole unit of each circuit interrupter supported adjacent the associated end wall. Each of the terminal blocks is provided with a first opening therein for receiving a conducting line that extends into the receptacle through the opening means in the associated end wall. Each of the terminal blocks is provided with a second or tapped opening therein that extends generally normal to the first opening and that leads into the first opening. There is a separate terminal screw in each of the tapped openings. There is a separate fuse clip connected to each of the terminal blocks extending frontward from the associated terminal block in a position between the associated end wall and the terminal screw. Elongated fuses are supported in the associated fuse clips with the fuses extending substantially to the end walls. With the fuses out of the fuse clips the terminal screws can be operated from the front of the receptacle to pressure connect the conducting lines to the terminal blocks. This construction and arrangement of parts provides for an efficient utilization of the available space within the receptacle.

BRIEF DESCRIPTION OF THE DRAWINGS

FIG. 2 is a side view, with parts broken away, of the enclosed switchgear illustrated in FIG. 1;

FIG. 3 is a sectional view taken generally along the line III—III of FIG. 2;

DESCRIPTION OF THE PREFERRED EMBODIMENTS

Figure 1:
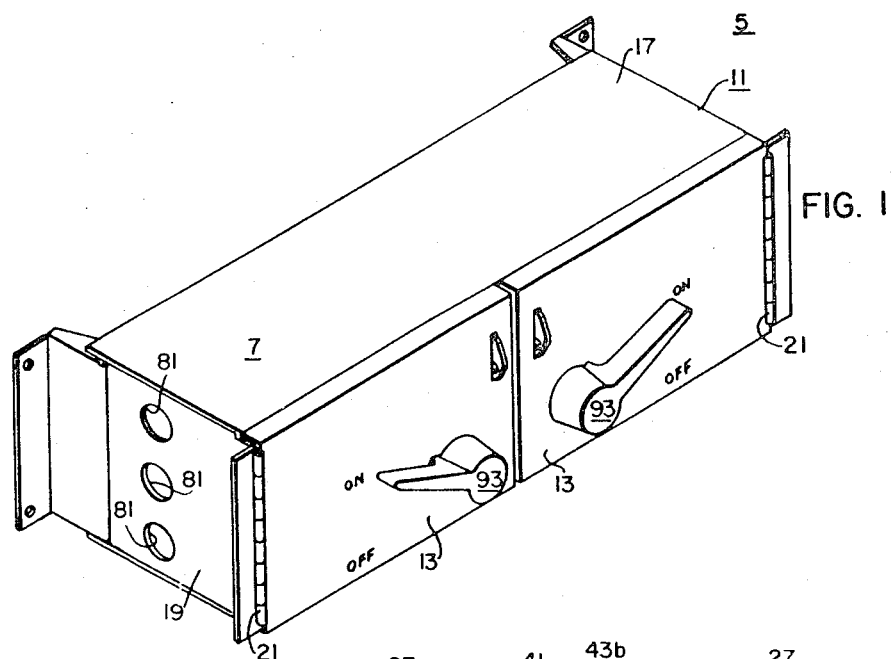
FIG. 1 is a perspective view of enclosed switchgear constructed in accordance with the principals of this invention.

Referring to the drawings, there is shown in FIGS.

1-3, enclosed switchgear 5 comprising an enclosure 7 and a pair of fused circuit interrupters 9 (FIGS. 2 and 3) supported in the enclosure 7.

The enclosure 7 comprises a receptacle 11 and a pair of openable covers 13. The receptacle 11 comprises a pair of back support plates 15, a pair of opposite side walls 17, and a pair of opposite end walls 19. The side walls 17 and end walls 19 extend frontward to form an opening at the front thereof, and the openable covers 13 cover the front opening. Each of the covers 13 is a generally planar cover supported on hinge means 21 for a pivotal movement between open and closed positions.

Figure 4:
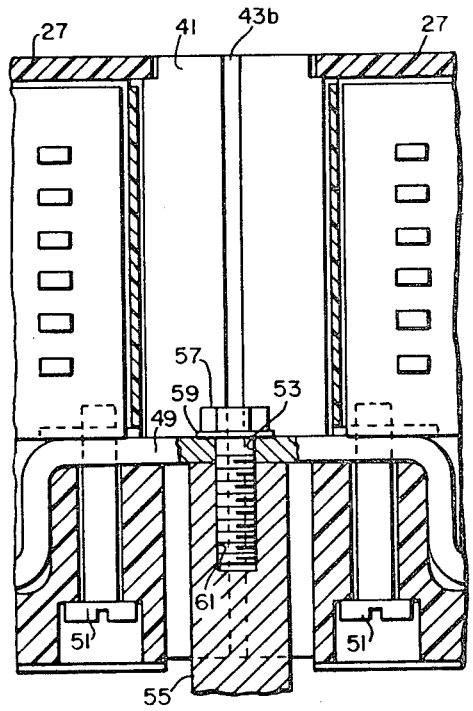
FIG. 4 is an enlarged sectional view taken generally along the line IV—IV of FIG. 3 with the addition of a conductor removably connected to the common line terminal conductor to enable connection of the common line terminal conductor in an electrical circuit.
Figure 9:
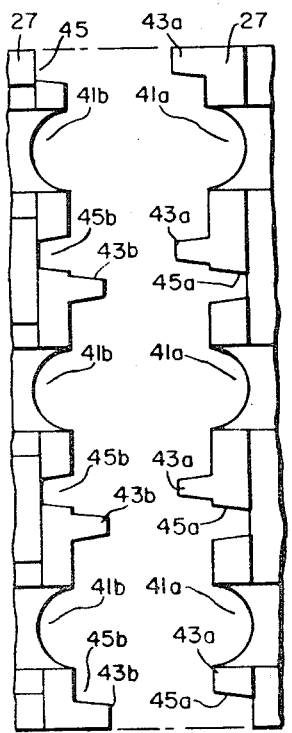
FIG. 9 is a plan view of parts of the two support blocks in separated positions.

Each of the fused circuit interrupters 9 comprises a three-pole circuit interrupter 23 and a three-pole fuse means 25. Each of the circuit interrupters 23 comprises an insulating support block 27 and a circuit interrupter structure 29 supported on the support block 27. Each of the circuit interrupter structures 29 is of the type more specifically described in the copending application of Stephen A. Mrenna et al, Ser. No. 815,595, filed Apr. 14, 1969. Thus, only a brief description of the circuit interrupter structure 29 is provided herein. Each of the insulating support blocks 27 is a molded insulating support block with barrier means molded integral therewith to provide three pole-unit compartments. In each pole unit there is a stationary clip type contact 31 and a movable knife-blade contact 33. The three movable knife-blade contacts 33 are connected to a pivotally supported common insulating tie bar 35 for simultaneous movement between the open and closed positions. An overcenter spring mechanism of the type described in the above-mentioned patent application Ser. No. 815,595 is operated by an operating lever 37 that is pivotally movable between open and closed positions to operate the overcenter spring mechanism to pivot the tie bar 35 to thereby open and close the three knife-blade contacts 33. Each of the operating levers 37 comprises a handle part 39 that is operated by a handle operator, when the covers are closed, in a manner to be hereinafter more specifically described. As can be understood with reference to FIGS. 3 and 9, the support block 27 (on the right) is formed with three separate pole-unit cavities 41a and the support block 27 (on the left) is formed with three separate pole-unit cavities 41b which cooperate when the support blocks 27 are mounted in a close end-to-end relationship to form three common pole unit cavities 41 (FIG. 3). The support block 27 (on the right FIG. 9) is formed with protrusions 43a and cavities 45a, and the support block 27 (on the left) is formed with protrusions 43b and cavities 45b. The protrusions and cavities 43a, 43b, 45a, 45b mate or nest together when the support blocks 27 are mounted in a close end-to-end relationship (FIG. 3) to provide a tortuous path between adjacent common pole-unit cavities 41 in order to provide insulation between line terminal conductors 49 (FIGS. 2-4). As can be understood with reference to FIGS. 2-4, the insulating support blocks 27 are mounted on the back plates 15 in a close end-to-end relationship and there is a separate unitary line terminal conductor 49 in each of the common cavities 41 connected to both of the associated stationary contacts 31. A pair of bolts 51 (FIG. 4) secure each common line terminal conductor 49 to the insulating support blocks 27. Each of the common line terminal conductors 49 is provided with an opening 53 therein. At the panel-board installation, a separable conductor 55 is passed up through the opening in the bottom of each of the common cavities 41, and a bolt 57 is passed through a washer 59 and threaded into a tapped opening 61 in the end of the associated conductor 55 to removably secure the conductor 55 to the associated common line terminal conductor 49 to electrically connect the associated conductor 55 with the associated common line terminal conductor 49. Each of the common cavities 41 is open at the front thereof, and a screwdriver can be passed down through the opening to work the bolt 57 to removably connect the conductor 55 to the associated common line terminal conductor 49. At the installation, suitable conductors are connected to the three common conductors 55 that protrude through the bottom of the cavities 41 in order to connect the line ends of the fused circuit interrupters 9 to a suitable power source. As can be understood with reference to FIG. 9, each of the cavity portions 41a, 41b of the mounting blocks 27 is open at the front, at the back and at the end of the associated mounting block with the common pole-unit cavities 41 (FIG. 4) being open at the front and at the back thereof. The protrusions and cavities (FIG. 9) that are formed integral with the support blocks 27 cooperate and mate to provide a tortuous path between the adjacent common pole unit cavities 41 (FIG. 4) in order to provide adequate insulation between adjacent common line terminal conductors 49.

As can be understood with reference to FIGS. 1 and 2, each of the contact arms 33 is electrically connected to a fuse clip 65 by means of a conductor 67 and a pair of flexible conductors 69. Each of the fuse clips 65 is spaced from another fuse clip 71 that is connected to the front of a terminal block 73 by means of a bolt 74. The terminal blocks 73, for the three pole units, are secured to an insulating support block 75 by means of bolts 77. Each of the terminal blocks 73 is provided with an elongated opening 79 therein, and the associated end wall 19 of the receptacle is provided with a separate opening 81 therein aligned with each of the openings 79. Each of the terminal blocks 73 is also provided with a tapped opening 83 therein open at the front of the terminal block 73 and extending generally normal to the associated opening 79. A separate screw connector 85 is threadedly supported on each of the terminal blocks 73 in the associated opening 83. At the installation, a separate load conductor 87 is passed into each of the openings 81 in the receptacle and into the associated opening 79, and the associated screw-type pressure connector 85 is screw down to pressure connect the conductor 87 to the terminal block 73. The connection of the conductor 87 to the terminal block 73 is made only when the associated fuse 89 is removed from the clips 65, 71. After the connection of the conducting lines 87 which connect the associated fuse circuit interrupter to a load, the fuses 89 are moved into the fuse clips 65, 71 to thereby connect the fuses in series with the contacts 31, 33 of the circuit interrupters. By constructing and arranging the terminal blocks 83 such that the screw-type connectors 85 are on the inside of the associated fuse clips 71, the terminal blocks 73 can be mounted in close proximity to the end walls of the receptacle thereby providing for efficient utilization of the available space within the receptacle.

Figure 5:
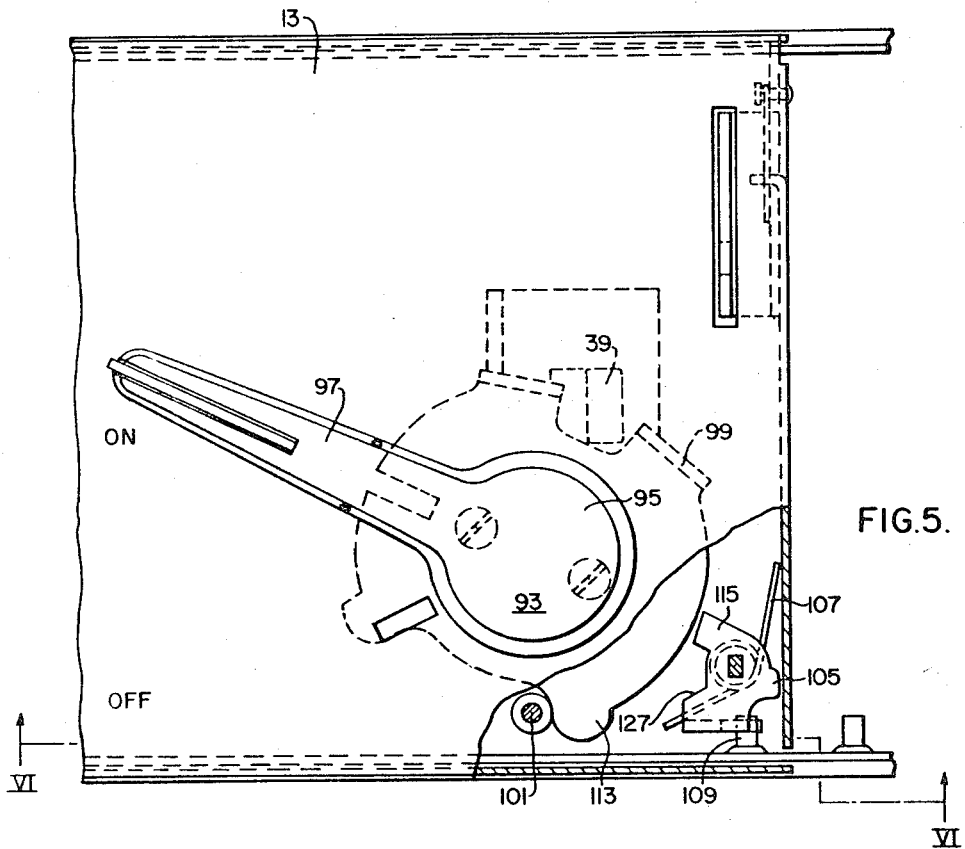
FIG. 5 is a plan view, with parts broken away, illustrating one of the handle operators and cover latches of the enclosed switchgear.
Figure 6:
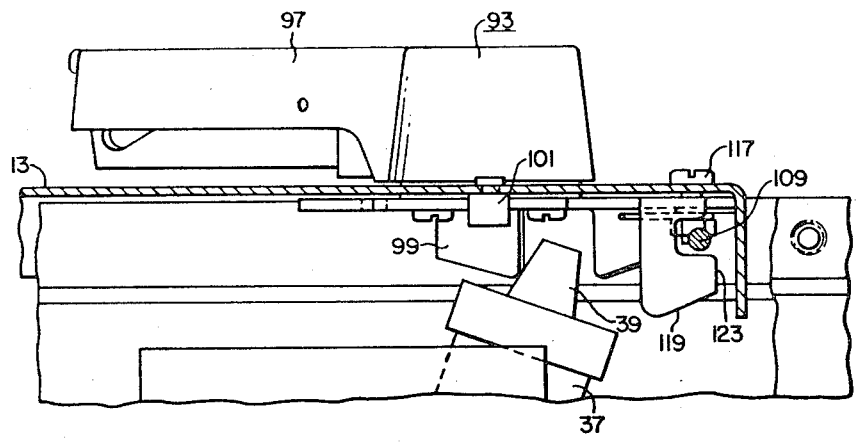
FIG. 6 is a sectional view taken generally along the line VI—VI of FIG. 5.
Figure 7:
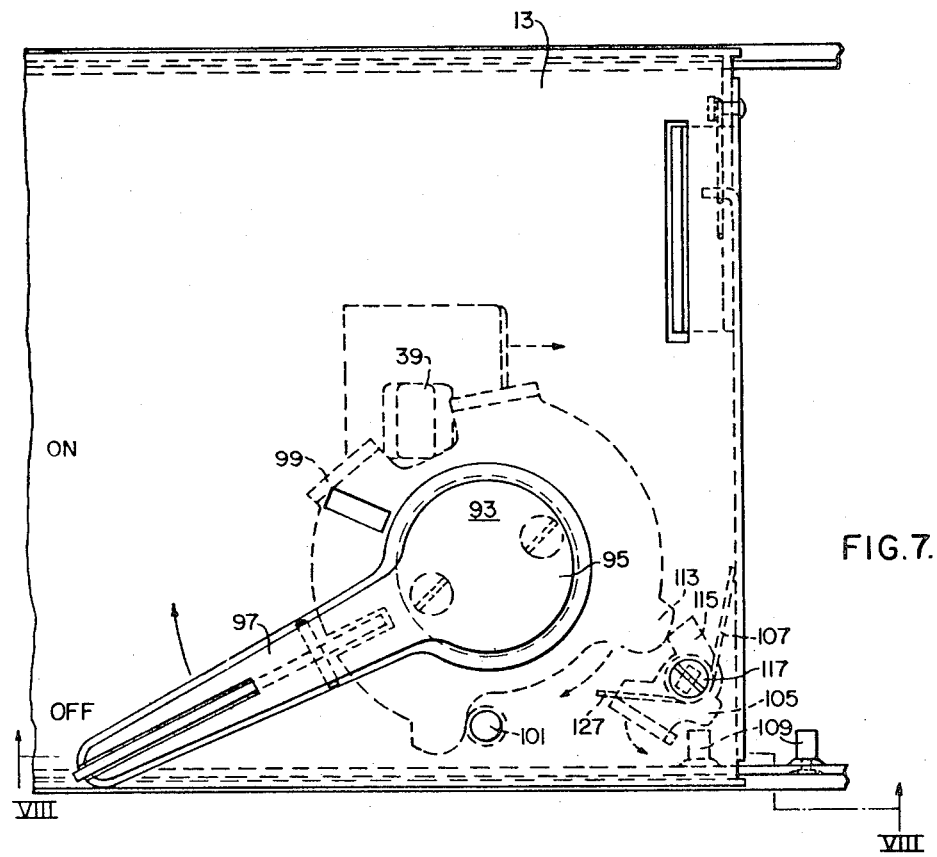
FIG. 7 is a plan view of the parts shown in FIG. 5 with the externally operable handle operator shown in the "off" or open position.
Figure 8:
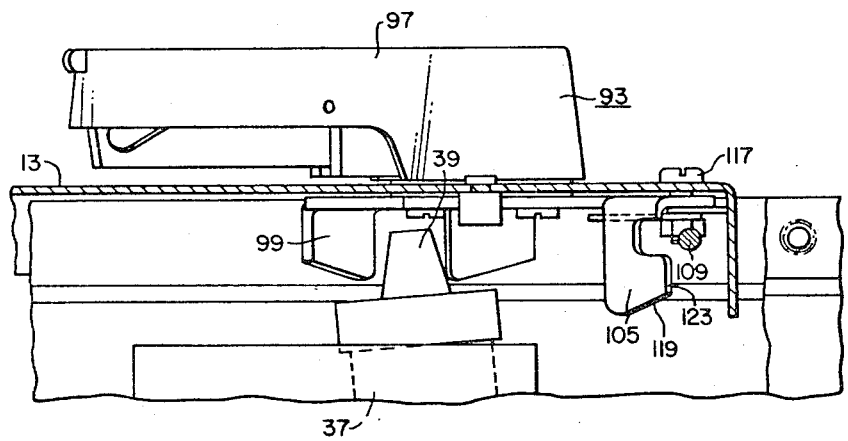
FIG. 8 is a sectional view taken generally along the line VIII—VIII of FIG. 7.

A separate externally operable handle operator 93 is supported on each of the openable covers 13 for movement about an axis 95 (FIGS. 5 and 7) which is normal to the plane of the associated cover 13. Since the handle operators 93 are of like construction only one of the handle operators will be herein specifically described. The handle operator 93 comprises an external handle 97 on the front side of the cover 13 and an internal claw-type operator 99 on the inside of the cover 13. The external handle 97 and internal claw-type operator 99 are secured together for simultaneous movement in a manner well known in the art. As can be understood with reference to FIGS. 2 and 5–8, when the external cover 13 is pivoted to the closed position the claw-type internal operator 99 straddles the handle 39 to operatively connect the external handle operator 93 with the handle 39 of the circuit interrupter. A stop pin 101 (FIGS. 5 and 6) is provided for engaging the internal operator 99 to limit movement of the handle operator 93 in both directions.

There is a cover latch 105 mounted on the inside of the cover 13 for pivotal movement about an axis parallel to the axis 95 of the handle operator 93. Each of the cover latches 105 is biased, by means of a torsion spring 107, to the latching position seen in FIGS. 5 and 6. There is a projecting pin or latch part 109 fixedly secured to one sidewall of the receptacle for cooperating with the cover latch 105. As can be understood with reference to FIGS. 5–8, the cover latch 105 is provided with a hook portion (FIG. 6) that cooperates with the latch part 109 to latch the cover closed when the handle operator 97 is in the "on" or closed position. Upon movement of the handle operator 93 from the "on" position seen in FIGS. 5 and 6 to the "off" or open position seen in FIGS. 7 and 8, a part 113 of the internal operator 99 engages a part 115 of the cover latch 105 to pivot the cover latch 105 from the latching position seen in FIGS. 5 and 6 to the unlatched position seen in FIGS. 7 and 8. Thus, with the handle operator in the "off" or open position so that the enclosed circuit interrupter is in the "off" or open position the cover latch 105 is maintained in the unlatched position to enable opening of the cover 13. When the handle operator 93 is moved to the "on" or closed position (FIGS. 5 and 6) the cover latch 105 is released and the spring 107 biases the cover latch 105 to the latching position seen in FIGS. 5 and 6 to latch the cover 13 in the closed position. An externally operable bolt 117 is connected to the cover latch 105 and extends to the front side of the cover 13 to enable defeat of the cover latch 105 when the handle operator is in the "on" or closed position. With the handle operator 93 in the "on" position a screwdriver can be inserted into the part 117 and rotated to move the latch 105 against the bias of the spring 107 to an unlatching position to permit opening of the cover 13. Upon release of the member 117 the spring 107 will automatically move the cover latch 105 back to the latching position. If the cover latch 105 is in the latching position and the cover is moved to the closed position a cam surface 119 (FIG. 6) will engage the pin 109 to cam the cover latch 105 in a clockwise (FIG. 5) direction until the cover latch 105 clears the pin 109 whereby the spring 107 will bias the cover latch 105 into the latching position seen in FIGS. 5 and 6. Upon operation of the external handle operator 93 between the "on" and "off" positions when the cover 13 is in the closed position the internal claw-type operator will move the handle 39 of the associated circuit interrupter between the "on" and "off" positions to operate the associated contacts 33 between the "on" or closed and "off" or open positions. The depth dimension of the part 123 (FIGS. 6 and 8) of the cover latch 105 is such relative to the construction of the internal operator 99 and handle 39 that if the handle operator 93 is in the "off" position and the cover is not fully closed, the surface 123 (FIG. 8) of the cover latch 105 will engage the pin 109 to prevent counterclockwise (FIG. 7) rotation of the cover latch 105 and the projecting part 113 on the internal operator 99 will engage a surface 127 of the cover latch 105 to prevent movement of the handle operator 93 from the "off" to the "on" position. When the cover is fully closed, the latch 105 will move to the latching position seen in FIGS. 5 and 6 under the bias of the spring 107 and the external handle operator 93 can then be freely moved from the "off" to the "on" position.

What is claimed is:

1. Enclosed switchgear comprising a receptacle and a pair of multi-pole circuit interrupters supported in the receptacle, each of said circuit interrupters comprising an insulating support member and a circuit interrupter structure on the insulating support member, each of said circuit interrupter structures comprising a pair of cooperating contacts and means operable to open and close the contacts, each of said insulating support members having a line end and a load end and being formed with a separate pole unit cavity at the line end thereof for each pole unit thereof with insulating barrier means between adjacent pole units and with each cavity being open at the front and open at the line end of the support member, said insulating support members at the line ends thereof being formed with cooperating mating end formations, said insulating support members being supported in said receptacle in a close end-to-end relationship at the line ends thereof with said pole unit cavities providing common pole unit cavities and with said cooperating mating end formations mating thereby providing a tortuous path between adjacent common pole unit cavities, and a separate common line terminal conductor in each of said common pole unit cavities connected to the associated pole unit contacts of both of said circuit interrupters.

2. Enclosed switchgear according to claim 1, each of said common pole unit cavities being open at the front and open at the back thereof, and each of said common line terminal conductors being adapted to receive connection thereto of a conducting member that may be brought in through the open back of the associated common pole unit cavity.

3. Enclosed switchgear according to claim 2, each of said common line terminal conductors having an opening therein for receiving a mounting bolt that may be passed from the front of said associated pole unit cavity through the opening and threaded into a conductor that may be passed up through the open back of the associated common pole unit cavity to be electrically connected to the common line terminal conductor by means of said bolt which may be threaded into a tapped opening in the conductor.

* * * * *